(12) United States Patent
Long

(10) Patent No.: US 9,433,224 B2
(45) Date of Patent: Sep. 6, 2016

(54) POULTRY PROCESSING EQUIPMENT

(71) Applicant: Hua Long, Monterey Park, CA (US)

(72) Inventor: Hua Long, Monterey Park, CA (US)

( * ) Notice: Subject to any disclaimer, the term of this patent is extended or adjusted under 35 U.S.C. 154(b) by 20 days.

(21) Appl. No.: 14/309,004

(22) Filed: Jun. 19, 2014

(65) Prior Publication Data
US 2015/0004893 A1  Jan. 1, 2015

Related U.S. Application Data

(60) Provisional application No. 61/840,819, filed on Jun. 28, 2013.

(51) Int. Cl.
*A22C 21/00* (2006.01)

(52) U.S. Cl.
CPC ................................ *A22C 21/0023* (2013.01)

(58) Field of Classification Search
CPC .. A22B 5/0017; A22B 5/0029; A22C 17/00; A22C 17/02; A22C 21/00; A22C 21/0023; A22C 21/0046
USPC ................ 452/149, 150, 151, 152, 153, 155
See application file for complete search history.

(56) References Cited

U.S. PATENT DOCUMENTS

| | | | | |
|---|---|---|---|---|
| 3,889,583 A * | 6/1975 | Mizuno | A23N 5/00 99/576 |
| 4,604,771 A * | 8/1986 | Dolle | A22C 17/006 227/139 |
| 4,765,234 A * | 8/1988 | Cailliot | A47J 17/16 99/593 |
| 5,357,853 A * | 10/1994 | Nelson | B26D 7/01 99/421 V |
| 5,679,069 A * | 10/1997 | Van Ochten | A22B 5/0094 452/120 |
| 5,806,414 A * | 9/1998 | Heinzen | A23N 7/026 99/591 |
| 6,019,674 A * | 2/2000 | Austin | A22B 3/06 452/58 |
| 6,176,177 B1* | 1/2001 | Ito | A23N 7/026 99/537 |
| 6,523,464 B1* | 2/2003 | Widelo | A23N 7/026 99/541 |
| 8,584,565 B1* | 11/2013 | Hortelius | A22C 11/00 30/124 |
| 8,584,662 B2* | 11/2013 | Whitehead | B26F 1/14 125/23.01 |
| 2005/0072322 A1* | 4/2005 | Weber | B26D 7/2635 99/537 |

* cited by examiner

*Primary Examiner* — David Parsley
(74) *Attorney, Agent, or Firm* — Che-Yang Chen; Law Offices of Scott Warmuth

(57) ABSTRACT

A poultry processing equipment includes a control panel and a receiving space. The control panel may include a switch to control the equipment and a few control buttons to control the movement of other components of the equipment. The receiving space is used to receive the poultry that would be processed, and the receiving space is covered by transparent covers. The poultry processing equipment may also include a first cutting unit, a first motor, a plurality of vertical threaded shafts and a second cutting unit. The first cutting unit is reverse Y-shaped and the receiving space is between the control panel and the first cutting unit. The first motor is used to horizontally drive the receiving space through a horizontal threaded shaft, while the vertical shafts are used to drive the second cutting unit to move vertically to further process the poultry.

5 Claims, 6 Drawing Sheets

POULTRY PROCESSING EQUIPMENT

FIELD OF THE INVENTION

The present invention relates to a poultry processing equipment, and more particularly to an automatic poultry processing equipment that can automatically process the poultry inside while keeping the shape of the poultry.

BACKGROUND OF THE INVENTION

Poultry is a category of domesticated birds kept by humans for the purpose of collecting their eggs, or killing for their meat or feathers. Poultry processing industries commonly use automated lines to kill, eviscerate, pluck and further process birds. Rotational devices are generally employed to facilitate continuity of process and to minimize labor. One of the most common poultry processing machines is a plucker or de-featherer. For many years devices incorporating a number of pliable fingers have been utilized to beat and pull the feathers from bird carcasses.

When a consumer purchases a chicken or duck after preliminary poultry processing, the consumer may still have to manually cut the chicken or duck into smaller pieces, which may take a lot of efforts because the chicken or duck still has a lot of bones that are hard to cut through. Moreover, even though the chicken or duck can be cut through, the shape of the chicken or duck cannot be preserved. Thus, there remains a need for a new and improved poultry processing equipment that can overcome the problems stated above.

SUMMARY OF THE INVENTION

The problems the present invention wants to solve are when a consumer purchases a chicken or duck after preliminary poultry processing, the consumer may still have to manually cut the chicken or duck into smaller pieces, which may take a lot of efforts because the chicken or duck still has a lot of bones that are hard to cut through. Moreover, even though the chicken or duck can be cut through, the shape of the chicken or duck cannot be preserved.

The present invention provides a poultry processing equipment including a control panel and a receiving space. The control panel may include a switch to control the equipment and a few control buttons to control the movement of other components of the equipment. The receiving space is used to receive the poultry that would be processed, and the receiving space is covered by transparent covers.

The poultry processing equipment may also include a first cutting unit, a first motor, a plurality of vertical threaded shafts and a second cutting unit. The first cutting unit is reverse Y-shaped and the receiving space is between the control panel and the first cutting unit. The first motor is used to horizontally drive the receiving space through a horizontal threaded shaft, while the vertical shafts are used to drive the second cutting unit to move vertically.

The poultry processing equipment may also include a second motor and a plurality of gears connecting to the second motor through chains. When the second motor is triggered, it drives the vertical threaded shafts through the gears to control the vertical movement of the second cutting unit. Similarly, a third motor is used to control the vertical movement of the first cutting unit. It is noted that a sensor is disposed on top of the equipment to ensure that when the covers are not in place, any motor in the equipment will not be started.

DETAILED DESCRIPTION OF THE INVENTION

Figure 1:
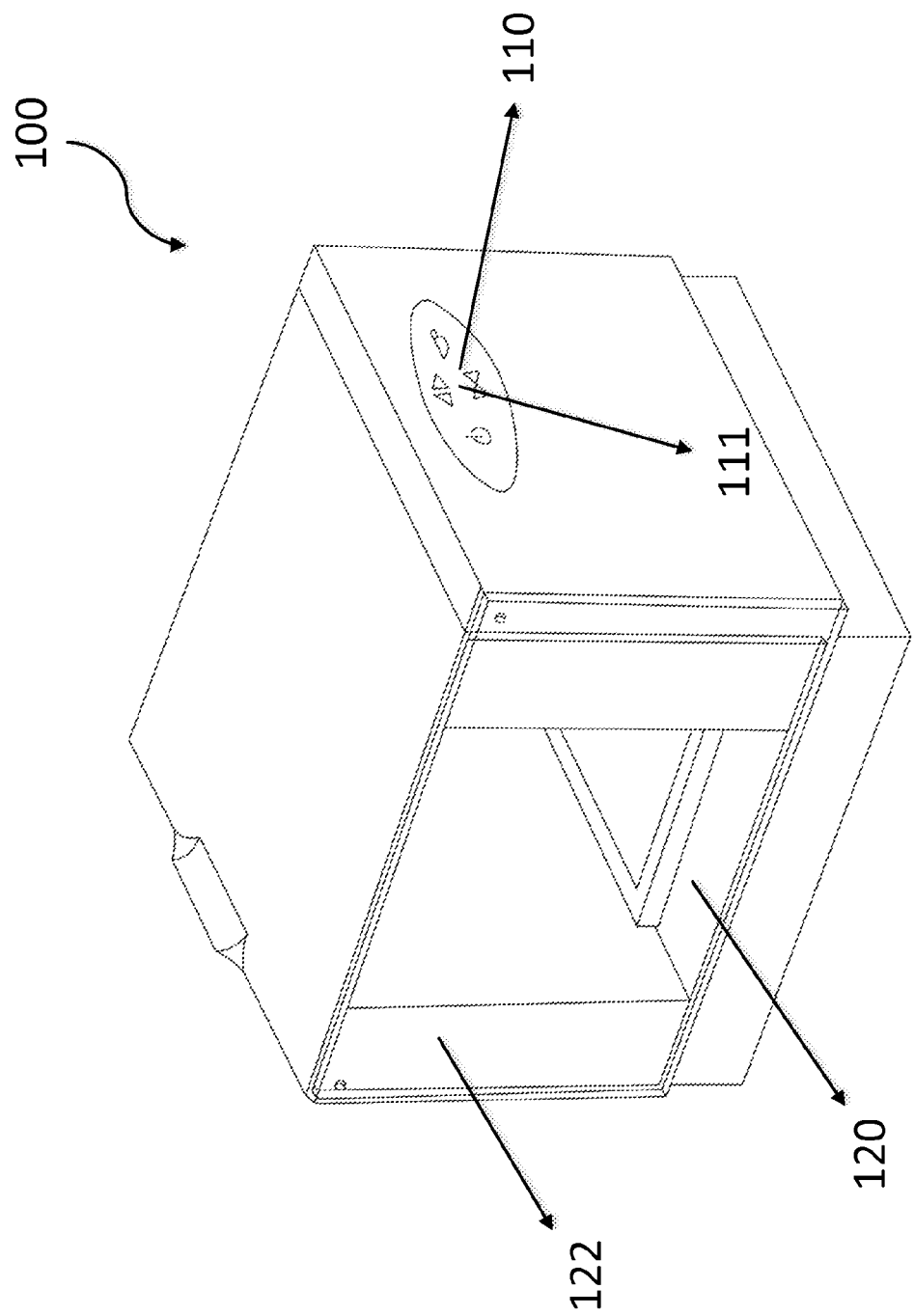
FIG. 1 illustrates a poultry processing equipment in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, a poultry processing equipment 100 may include a control panel 110 and a receiving space 120. The control panel 110 may include a switch to control the equipment 100 and a plurality of control buttons 111 to control the movement of other components of the equipment 100. The receiving space 120 is used to receive the poultry that would be processed, and the receiving space 120 is covered by transparent covers 121 and 122.

Figure 2:
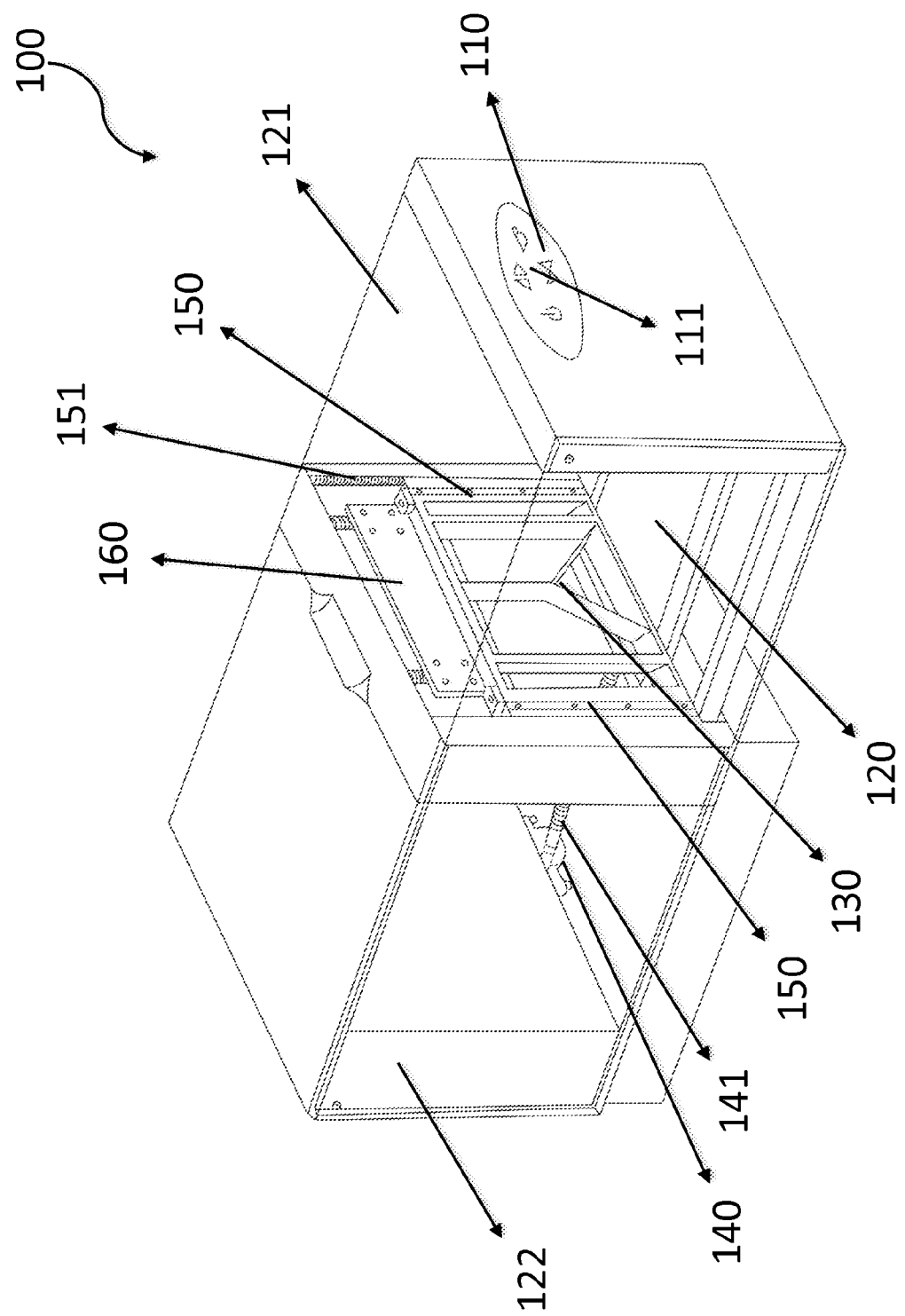
FIG. 2 illustrates a perspective view of the poultry processing equipment in the present invention.
Figure 3:
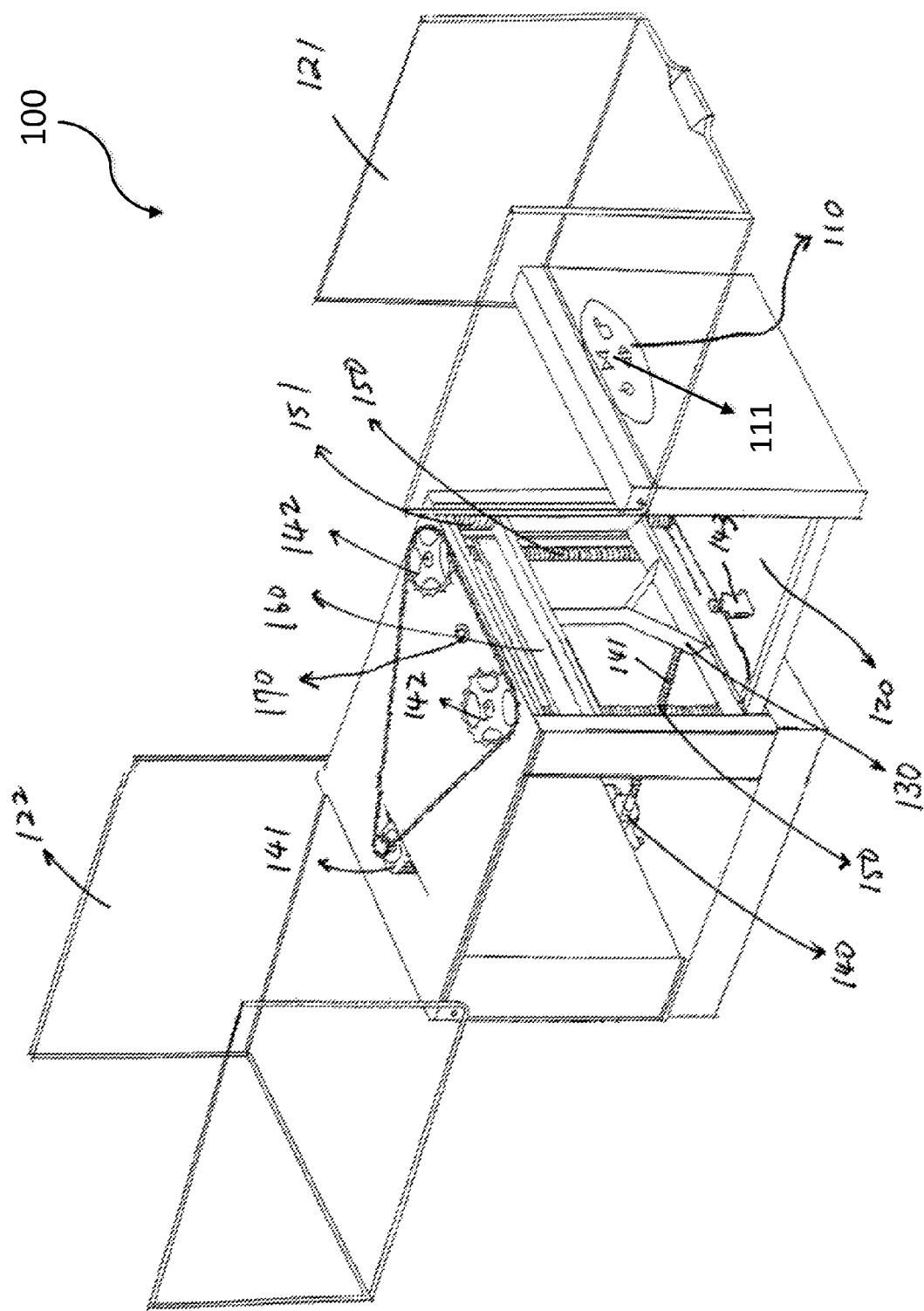
FIG. 3 illustrates an exploded view of the poultry processing equipment in the present invention.

As can be seen in FIGS. 2 and 3, the poultry processing equipment 100 may also include a first cutting unit 130, a first motor 140, a plurality of vertical threaded shafts 150 and a second cutting unit 160. The first cutting unit 130 is reverse Y-shaped and the receiving space 120 is between the control panel 110 and the first cutting unit 130. The first motor 140 is used to horizontally drive the receiving space 120 through a horizontal threaded shaft 141, while the vertical shafts 150 are used to drive the second cutting unit 160 to move vertically to further process the poultry.

More specifically, the poultry processing equipment 100 may also include a second motor 141 and a plurality of gears 142 connecting to the second motor 141 through chains. When the second motor 141 is triggered, it drives the vertical threaded shafts 150 through the gears 142 to control the vertical movement of the second cutting unit 160. Similarly, a third motor 143 is used to control the vertical movement of the first cutting unit 130. It is noted that a sensor 170 is disposed on top of the equipment 100 to ensure that when the covers 121 and 122 are not in place, any motor in the equipment will not be started.

Figure 4:
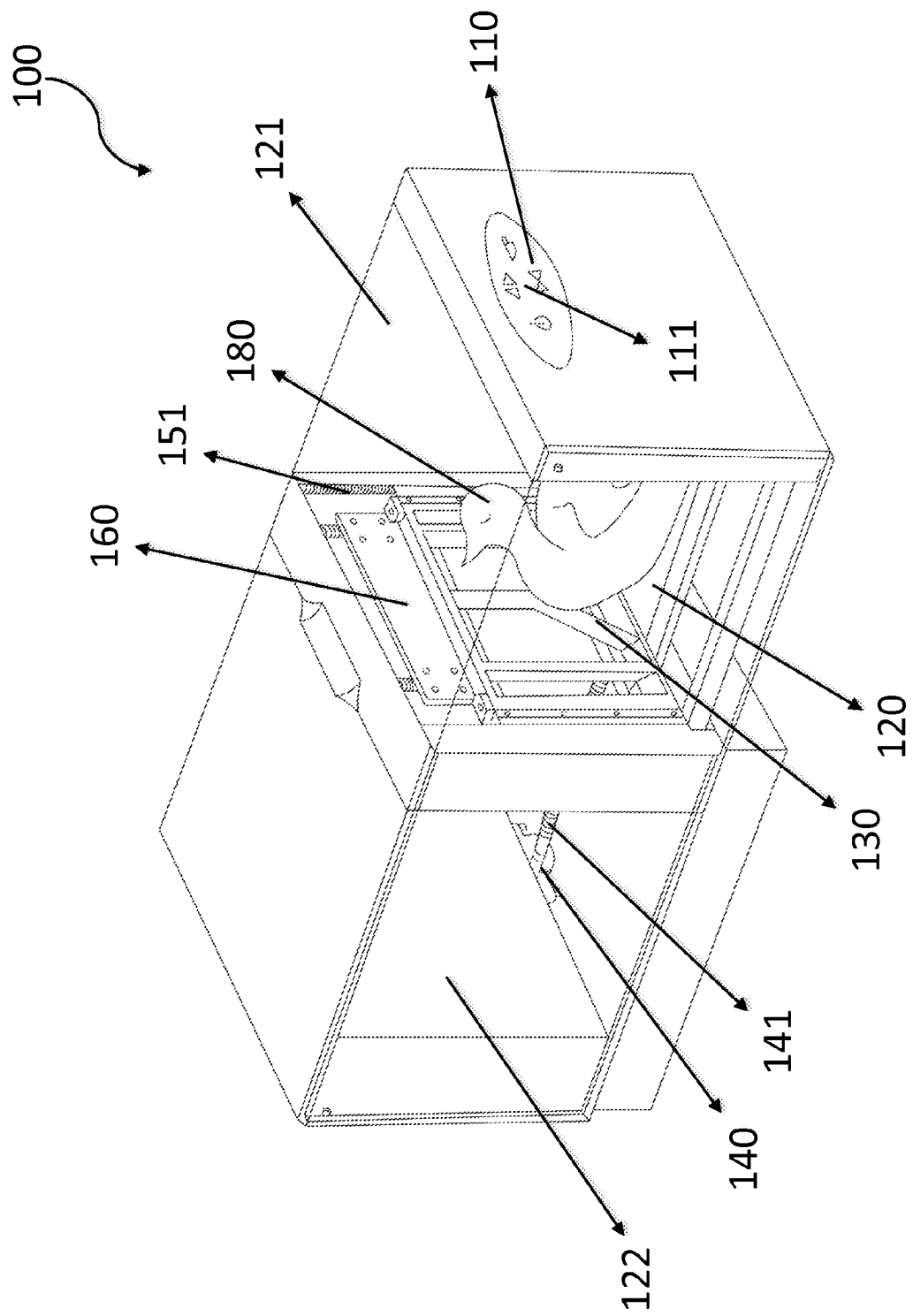
FIG. 4 illustrates a schematic view of a use case in the present invention.

Referring to FIG. 4, when a chicken (or duck) 180 is disposed in the receiving space 120, the user can press the start button on the control panel 110 to start the first motor 140 to pull the receiving space toward the first cutting unit 130 and the chicken will be cut by the reverse Y-shaped cutting unit 130 into roughly three pieces. The second cutting 160 will be triggered immediately by the second motor to cut the chicken in a vertical direction. The first motor 140 and second motor 141 can be programmed to control the movement of the receiving space 120 and the second cutting unit 160 to process the chicken 180.

Figure 5:
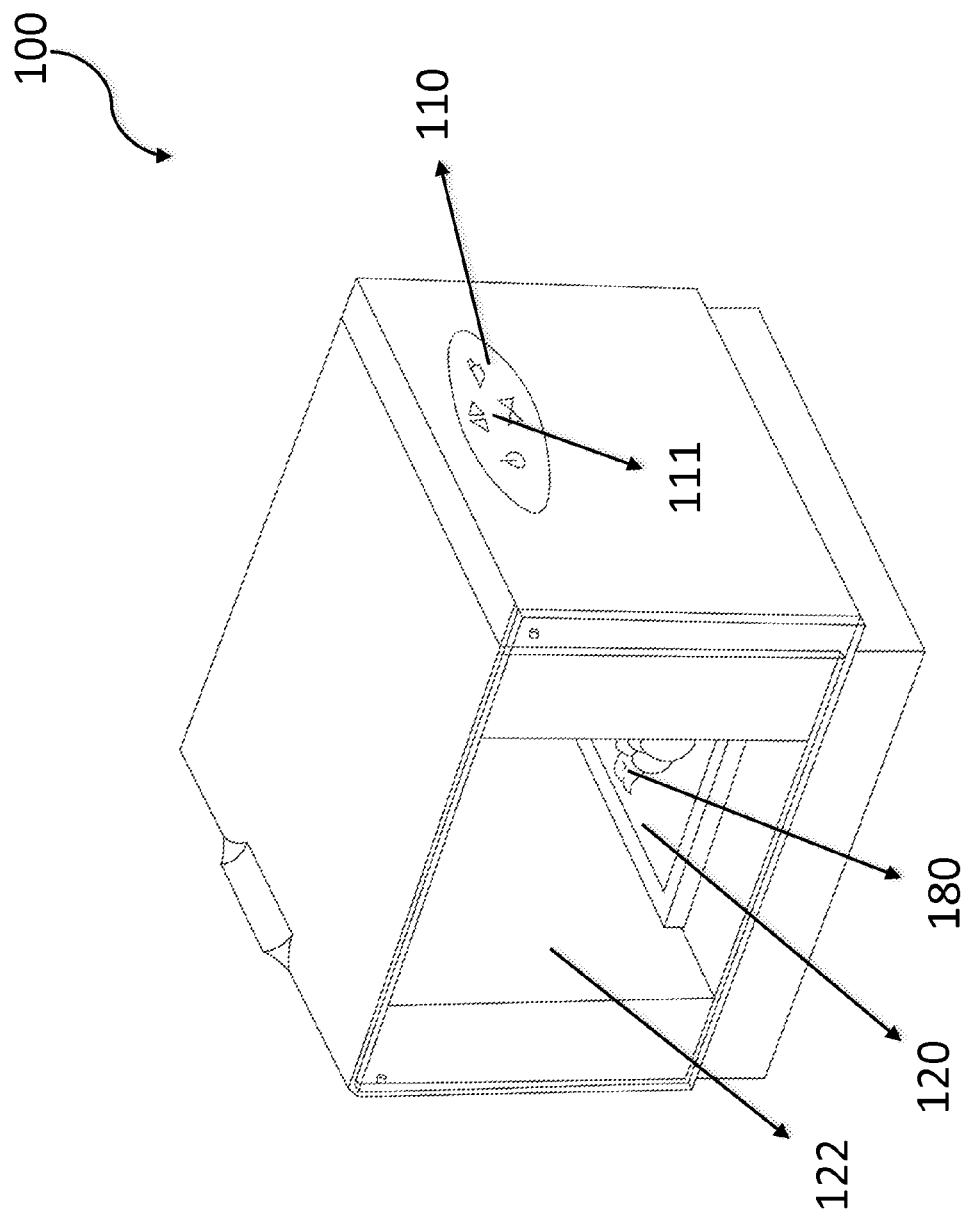
FIG. 5 illustrates a schematic view of a use case in FIG. 4 during the poultry is being processed in the present invention.
Figure 6:
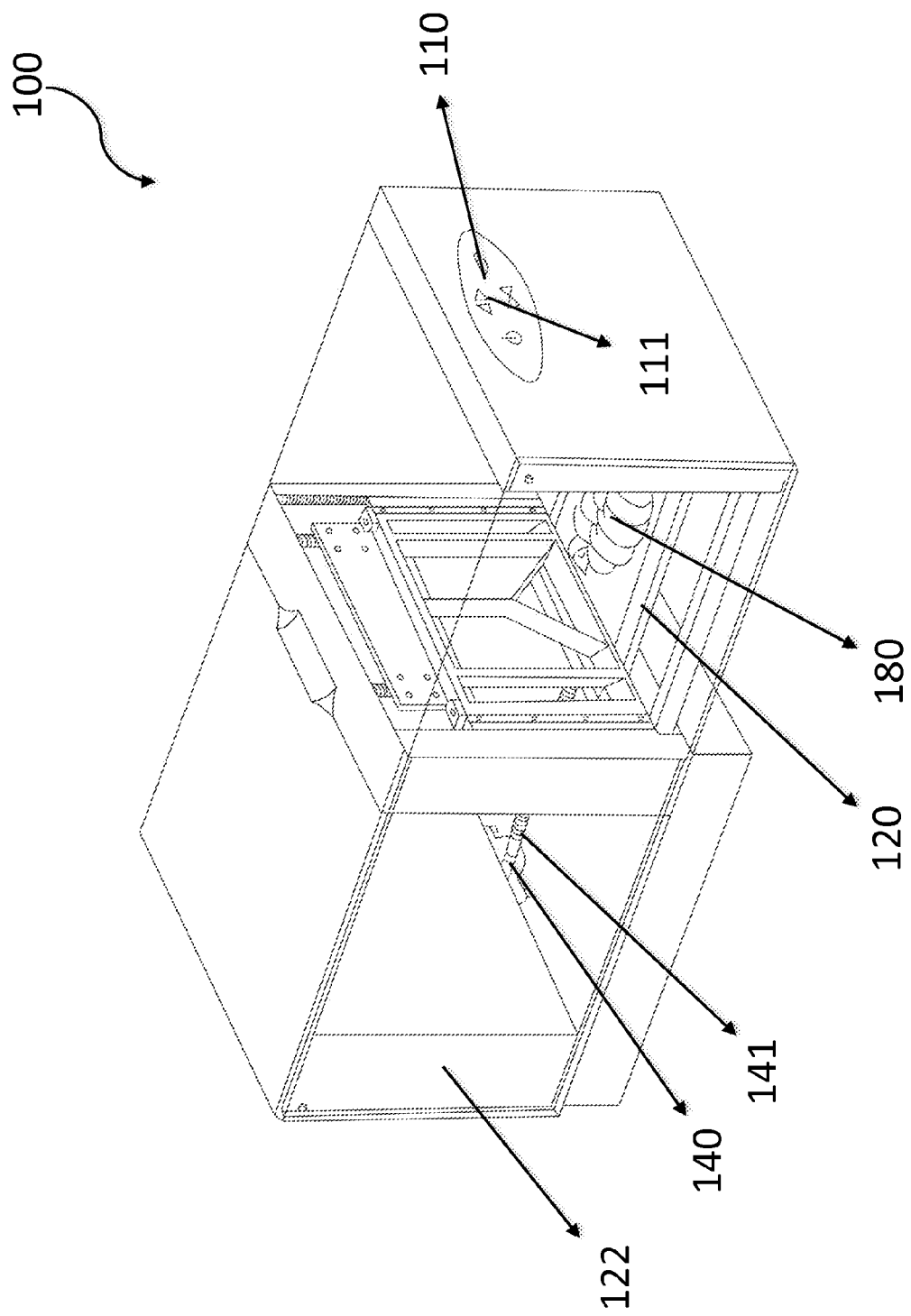
FIG. 6 illustrates a schematic view of the use case in FIG. 4 after the poultry is being processed in the present invention.

After the chicken 180 is being processed, it can be automatically sent out as FIG. 5. The first cutting unit 130 can be lifted by the third motor 143 when the chicken is sent out. It is advantageous that the user does not have to manually cut the chicken and the chicken can be cut while preserving its shape.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A poultry processing device comprising a control panel including a switch and a plurality of control buttons to control the device; a receiving space; a first cutting unit; a first motor; a plurality of vertical threaded shafts; a second motor and a second cutting unit,
   wherein the first cutting unit is reverse Y-shaped and the receiving space is located between the control panel and the first cutting unit, and the first motor is used to horizontally drive the receiving space through a horizontal threaded shaft, while the vertical shafts are used to drive the second cutting unit to move vertically to further process the poultry,
   wherein the second motor and a plurality of gears are arranged in a triangle manner through a chain, and when the second motor is triggered, the vertical threaded shafts is driven through the gears to control the vertical movement of the second cutting unit, and a third motor is used to control the vertical movement of the first cutting unit,
   wherein the reverse Y-shaped first cutting unit includes a reversed V-shaped blade and an I-shaped blade connecting to a ridge of the V-shaped blade; the reverse Y-shaped first cutting unit is immovable and the I-shaped blade is perpendicular to the receiving space during entire poultry cutting process.

2. The poultry processing device of claim 1, wherein a sensor is disposed on top of the poultry processing device to ensure that a poultry cutting process does not start until the receiving space is properly covered.

3. The poultry processing device of claim 1, wherein the first motor is configured to pull the receiving space toward the first cutting unit and the poultry thereon is cut by the reverse Y-shaped cutting unit into roughly three pieces, and the second cutting unit is then triggered immediately by the second motor to cut the poultry in a vertical direction.

4. The poultry processing device of claim 1, wherein the first motor and second motor are programmed to control the movement of the receiving space and the second cutting unit to process the poultry.

5. The poultry processing device of claim 1, wherein the first cutting unit is configured to be lifted by the third motor when the poultry is sent out after the poultry process.

* * * * *